United States Patent
Narasimha

(10) Patent No.: US 9,154,855 B2
(45) Date of Patent: Oct. 6, 2015

(54) METHOD AND SYSTEM FOR PROVIDING LOCATION BASED CONTENT DELIVERY BY EMBEDDING HIDDEN DATA IN A MULTIMEDIA FILE

(71) Applicant: TELIBRAHMA CONVERGENT COMMUNICATIONS PVT. LTD., Bangalore (IN)

(72) Inventor: Suresh Narasimha, Bangalore (IN)

(73) Assignee: TELIBRAHMA CONVERGENT COMMUNICATIONS PVT. LTD., Bangalore (IN)

( * ) Notice: Subject to any disclaimer, the term of this patent is extended or adjusted under 35 U.S.C. 154(b) by 0 days.

(21) Appl. No.: 13/939,401

(22) Filed: Jul. 11, 2013

(65) Prior Publication Data
US 2014/0020018 A1    Jan. 16, 2014

(51) Int. Cl.
| | |
|---|---|
| H04N 7/10 | (2006.01) |
| G06Q 30/00 | (2012.01) |
| H04R 29/00 | (2006.01) |
| H04N 21/8358 | (2011.01) |
| H04N 21/81 | (2011.01) |
| G06K 7/10 | (2006.01) |
| G09F 27/00 | (2006.01) |

(52) U.S. Cl.
CPC ......... *H04N 21/8358* (2013.01); *H04N 21/812* (2013.01); *H04N 21/8106* (2013.01); *G09F 27/00* (2013.01)

(58) Field of Classification Search
CPC .......... H04N 21/8358; H04N 21/8106; H04N 21/812; G06F 27/00
USPC ............ 725/35, 42, 51, 60, 62, 87, 109, 112, 725/113; 705/14.49, 14.67; 235/468, 235/462.09, 462.13; 381/56
See application file for complete search history.

(56) References Cited

U.S. PATENT DOCUMENTS

| | | | | |
|---|---|---|---|---|
| 8,484,299 | B2 * | 7/2013 | Mizosoe et al. | 709/206 |
| 2009/0108057 | A1 * | 4/2009 | Mu et al. | 235/375 |
| 2012/0082439 | A1 * | 4/2012 | Ashbrook et al. | 386/344 |
| 2012/0117605 | A1 * | 5/2012 | Miao et al. | 725/115 |
| 2012/0203363 | A1 * | 8/2012 | McKenna et al. | 700/94 |

* cited by examiner

*Primary Examiner* — Hoang-Vu A Nguyen-Ba
(74) *Attorney, Agent, or Firm* — Barry Choobin; Patent360 LLC

(57) ABSTRACT

The various embodiments herein provide a method and system for providing location based content delivery by embedding a hidden data in a multimedia file. The method comprises of encoding a hidden marker along with a multimedia content in the multimedia file, playing the multimedia file at a terminal of a particular location, initializing a client application pre-installed in a mobile device, recognizing and decoding the hidden marker in the multimedia file through the client application, sending the decoded hidden marker information to a central server, generating a list of postulated tasks based on the hidden marker information, sending the list of postulated tasks to the client application of the mobile device, selecting a task from the list of postulated tasks through the client application, sending the selected task information to the central server and playing the selected task at the terminal of the particular location by the central server.

18 Claims, 5 Drawing Sheets

METHOD AND SYSTEM FOR PROVIDING LOCATION BASED CONTENT DELIVERY BY EMBEDDING HIDDEN DATA IN A MULTIMEDIA FILE

CROSS-REFERENCE TO RELATED APPLICATIONS

The present application claims priority of Indian provisional applications with serial number 2348/CHE/2012 filed on 13 Jul. 2012, and that application is incorporated in its entirety at least by reference.

BACKGROUND

1. Technical Field

The embodiments herein generally relates to embedding digital information in multimedia files and particularly relates to method and system for recognizing and decoding hidden data embedded in the multimedia file in the mobile device. The embodiments herein more particularly relates to a method and system for providing services colligated with the hidden marker information to the user.

2. Description of the Related Art

Conventionally in the general advertisement delivery model adopted for television broadcasting, the advertising (images) are sent unidirectional to the television receivers by the television stations for viewing the images by the users. Furthermore, it is well known that advertising images are broadcasted in the intervals between the regular programs. Therefore, it is important for an advertiser to sponsor the programs that are likely to be viewed by most people so that the peoples viewing the program may view the advertisements displayed between the intervals and purchase the class of products displayed in the advertised images.

A growing number of television content sources enable interactive television. When operational, interactive television provides useful e-commerce, advertising, and information capabilities to viewers. One mechanism for interactivity typically involves the insertion of information or data in hidden portions of a multimedia signal. Modern analog/digital set top boxes or other client terminals can decode these signals to obtain the trigger information, and with the appropriate enabling software, convert the trigger information into a rich interactive experience for the viewer.

However, typical interactive television systems leave the interactive experience under the exclusive control of content providers. The user has limited opportunity to customize or enhance the viewing experience. In other words, because the content providers are typically the parties that provide and encode the multimedia information into the television signals, the MSO's role is often reduced to simply relaying the television signals to viewers without any modification or customization.

In addition, due to the embedded nature of the multimedia information, only the set top box has the capability to access and process the hidden information. This is inconvenient to viewers that wish to view and or otherwise have an interactive experience via use of devices other than the set top box and television. These ancillary devices includes a personal computer (PC), handheld display device, a mobile devices companion set top boxes, or other client terminals different from the set top box. Ancillary devices that are connected to the Internet, through a cable modem for instance, cannot decode the hidden information unless they have both the software and hardware compatibility.

In view of the foregoing, there is a need for providing a method and system for recognizing hidden information embedded within a multimedia file in a user device. There is also a need for a method and system which provides a plurality of services/tasks to the user based on the recognized hidden information. There is also a need for a method and system which enables the user to perform a plurality of customizable functionalities on the services based on the user preferences.

The abovementioned shortcomings, disadvantages and problems are addressed herein and which will be understood by reading and studying the following specification.

SUMMARY

The primary object of the embodiments herein is to provide a method and system for enabling location based content delivery using a hidden marker embedded in a multimedia file.

Another object of the embodiments herein is to provide a method and system for embedding a hidden marker containing advertisements, promotions or offers related to a product/service in a multimedia file.

Another object of the embodiments herein is to provide a method and system for providing a list of postulated tasks based on the hidden marker information.

Another object of the embodiments herein is to provide a method and system which enables the user to select a service/information from the postulated tasks based on the user preferences.

Another object of the embodiment herein is to provide a method and system for encoding a pest deterrent ultrasonic frequency signal in a multimedia file.

Another object of the embodiment herein is to provide a method and system for eradicating the pests from an area by playing a multimedia file encoded with an ultrasonic frequency signal.

These and other objects and advantages of the present embodiments will become readily apparent from the following detailed description taken in conjunction with the accompanying drawings.

The various embodiments of the present disclosure provide a method for location based content delivery using a hidden marker embedded in a multimedia file. The method for location based content delivery using the hidden marker in a multimedia file comprises of encoding the hidden marker along with a multimedia content in the multimedia file, playing the multimedia file at a terminal of a particular location, initializing a client application pre-installed in a mobile device, recognizing the bidden marker in the multimedia file through the client application pre-installed in the mobile device, decoding the hidden marker through the client application, sending the information decoded from the hidden marker to a central server, generating a list of postulated tasks based on the decoded information in the central server, sending, the list of postulated tasks to the client application of the mobile device, selecting a task from the list of postulated tasks through the client application, sending the selected task information to the central server through the client, application and playing the selected task at the terminal of a particular location by the central server.

According to an embodiment herein, the method for location based content delivery further comprises of registering one or more service providers with the central server and fetching the selected task from respective servers of the service providers based on the information embedded in the hidden markers.

According to an embodiment herein, the multimedia is one of a text, a still image, an audio, a video, an animation and interactivity content forms.

According to an embodiment herein, the hidden marker information is one of a text, a still image, an audio, a video, an animation and interactivity content forms.

According to an embodiment herein, the hidden marker information for the video comprises at least one of a unique ID of a television set such as IP TV, program details, multimedia content, advertisements, promotions or offers.

According to an embodiment herein, the hidden marker information for the audio comprises ongoing offers, deals, services, new services, new launchers and so on at the particular locations.

According to an embodiment herein, the method for location based content delivery using hidden marker in a multimedia further comprises of embedding an unique ultrasonic frequency signal in any one of the layers of the multimedia file. The embedded ultrasonic frequency signal is a pest deterrent frequency signal adapted to eradicate pest from the surrounding area.

Embodiments herein provide a system for location based content delivery using a hidden marker in a multimedia file. The system for location based content delivery using a hidden marker in a multimedia file comprising a central server for encoding the hidden marker in a multimedia file, a terminal for playing multimedia, a mobile device for capturing multimedia and a client application pre-installed in the mobile device for capturing and decoding the hidden marker.

According to an embodiment herein, the central server further comprises a registration module for registering the mobile device and one or more service providers, an encoder module for encoding hidden marker in the multimedia file, a database for storing information received from the one or more service providers and a task list generator module for generating one or more tasks.

According to an embodiment herein, the database keeps track of one or more service providers for fetching information from the respective servers based on the hidden marker's information embedded in the multimedia file.

According to an embodiment herein, the client application pre-installed in the mobile device decodes the hidden marker in the multimedia, wherein the information is decoded and sent to the task list generator module of the central server.

According to an embodiment herein, the task list generator module generates a list of postulated tasks and wherein the task list generator module sends the generated list of postulated tasks to the mobile device.

According to an embodiment herein, the user selects atleast one task from the list of postulated tasks and feeds back to the database of the central server through the client application pre-installed in the mobile device.

According to an embodiment herein, the database fetches the information related to the selected task from the respective servers and plays the selected tasks at the terminal of the particular location.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present embodiments are shown in some drawings and not in others. This is done for convenience only as each feature may be combined with any or all of the other features in accordance with the present embodiments.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
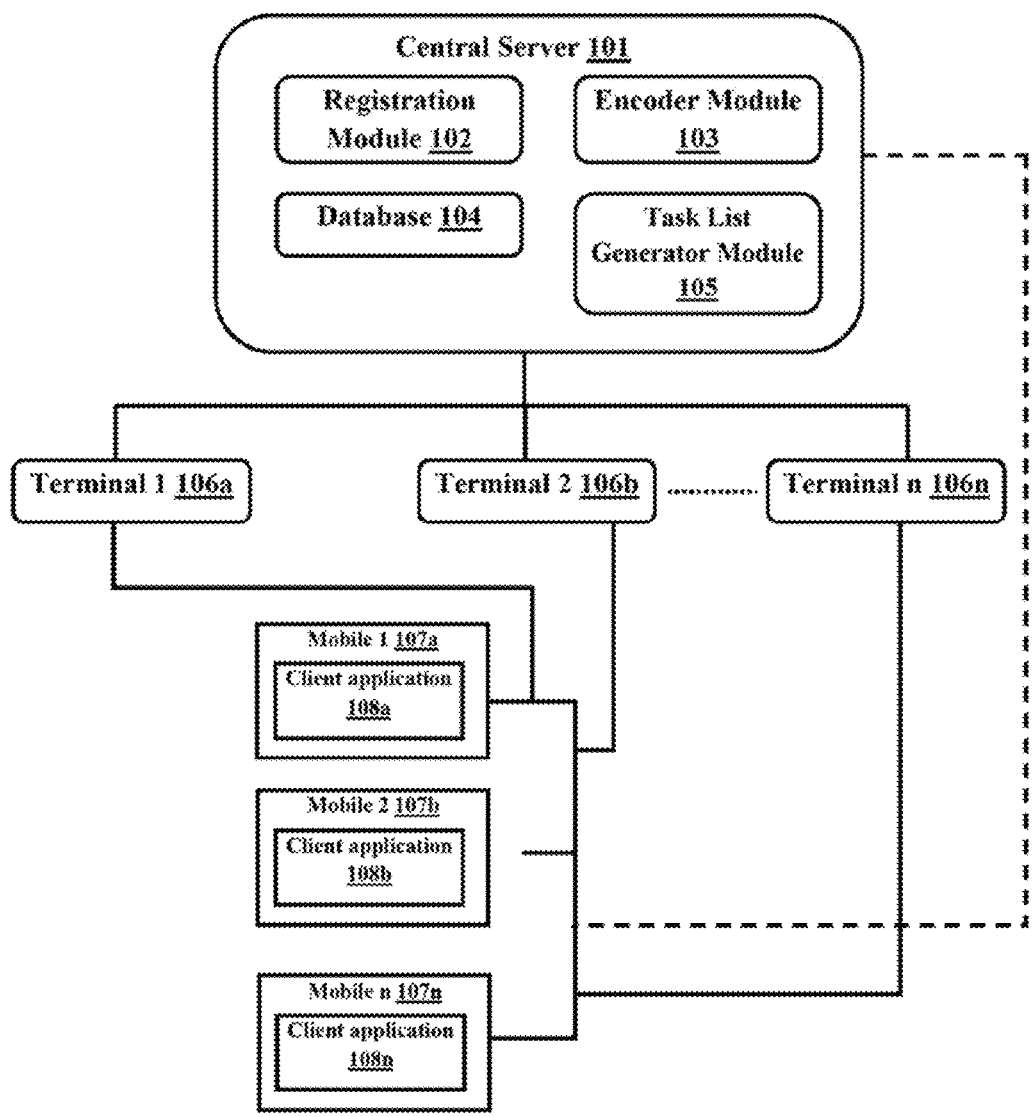
FIG. 1 illustrates a block diagram of a system for providing location based content delivery in a user mobile device, according to an embodiment of the present disclosure.

FIG. 1 illustrates a block diagram of a system for providing location based content delivery in a user mobile device, according to an embodiment of the present disclosure. The system according to FIG. 1 comprises a central server 101, a plurality of mobile terminals 106a-106n connected to the central server and a plurality of mobile devices 107a-107n associated with the mobile terminals 106a-106n. The central server 101 is provided with a registration module 102, an encoder module 103, a database 104 and a task list generator module 105. The mobile device 107a-107n comprises a client application 108a-108n installed respectively.

The user registers with the central server 101 by providing name, contact details and other user credentials. The registration module 102 acknowledges the user credentials and registers the mobile device associated with the user with the central server 101. The encoder module 103 is adapted to encode the hidden marker in the multimedia file. The hidden marker is at least one of an audio file, a video file, text, a still image, an animation, interactivity content forms and the like. The database 104 stores information provided by one or more service providers. The information comprises ongoing offers, recent deals, services offered, new services, new launchers etc., at the particular location respectively. The database 104 is updated with the service provider details constantly or on a periodical basis.

The encoder module 103 extracts the information like ongoing offers, recent deals, services offered, new services, new launchers and so on from the database 104 and embeds/encodes the information in the form of the hidden marker in the multimedia file, for instance, in an audio file format. The audio file with the embedded/encoded hidden marker is then played at the terminal 106a-106n of the particular location.

The user initializes the client application (108a-108n) which is pre-installed in the mobile device (107a-107n). The client application (108a-108n) recognizes the hidden marker embedded/encoded in the audio file and decodes the recognized hidden marker. The decoded hidden information is sent to the task list generator module 105 of the central server 101. The task list generator module 105 generates a list of postulated tasks and sends the list to the mobile device (107a-107m. The user selects a task from the list of postulated tasks. The selected task is then fed back to the database 104 of the central server 101. The database 104 of the central server 101 in turn plays the selected task at the terminal 106a-106n of the particular location.

Figure 2:
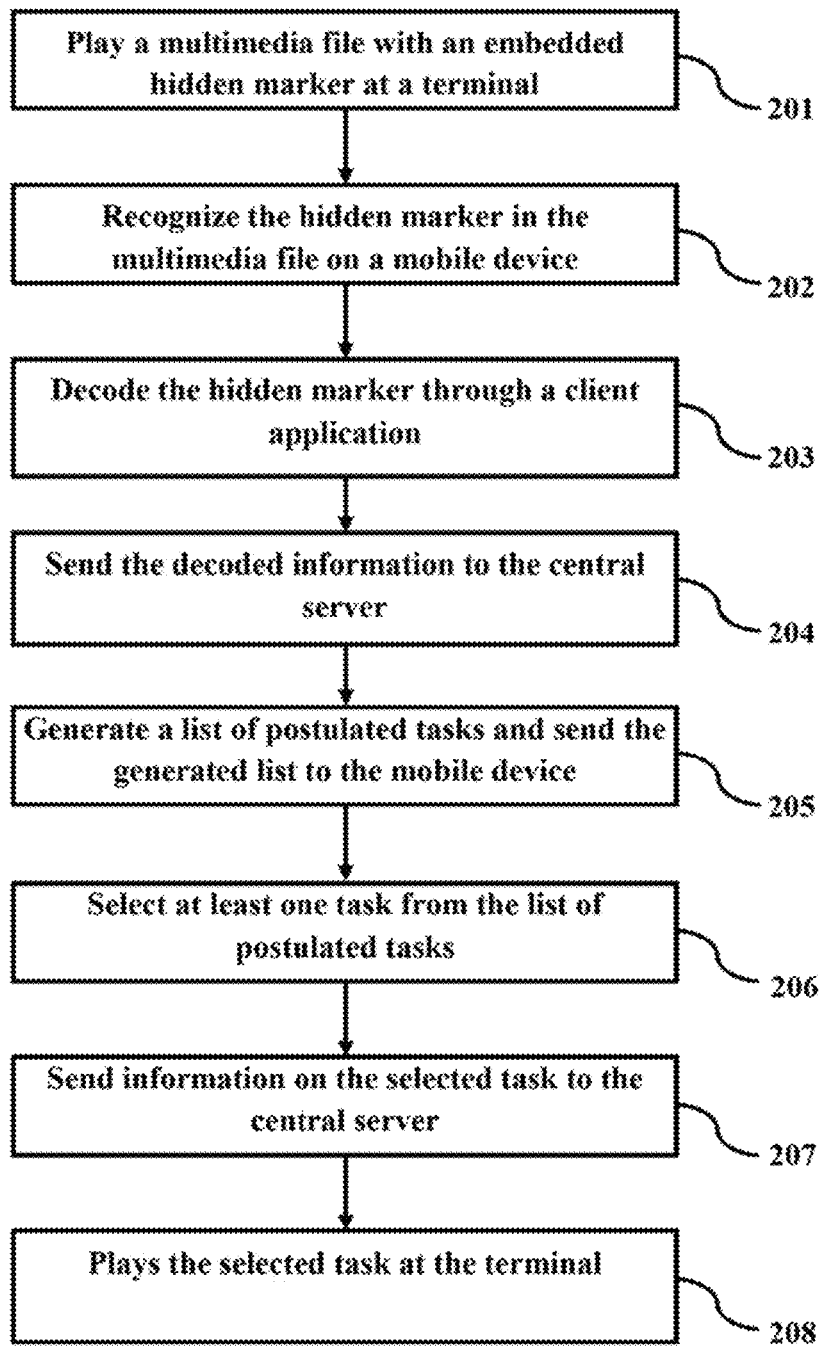
FIG. 2 is a flow chart illustrating a method for providing location based content delivery in a user mobile device based on a hidden marker embedded on a multimedia file, according to an embodiment of the present disclosure.

FIG. 2 is a flow chart illustrating a method for providing location based content delivery in a user mobile device based on a hidden marker embedded on a multimedia file, according to an embodiment of the present disclosure. With respect to FIG. 2, the hidden marker is embedded/encoded in the multimedia file at the central server. The hidden marker comprises information such as the service provider details, for instance brand like Cafe Coffee Day, Mc Donalds, Pizza Hut etc., the services offered by the service provider like Coffee, Berger, Pizzas and so on and the location details like Bangalore, Mangalore, Mysore, etc. The multimedia file embedded/encoded with the hidden marker is played at a terminal of the particular location (201). The hidden marker, for instance is an audio file such as a song, advertisements related to products, ongoing offers, promotional activities, tourism advertisements and the like. The terminal for instance is a multimedia player. The mobile device is any one of a smart phone, a laptop, a tablet, a personal digital assistant (PDA) or any user device. The user initializes the client application pre-installed in the mobile device. Alternatively, the client application can be downloaded from the central server and installed in the mobile device in run time. The client application recognizes the hidden marker embedded/encoded in the audio file (202) and decodes the hidden marker (203). Further, the client application sends the decoded information of the hidden marker to the central server (204). The central server generates a list of postulated tasks based on received hidden marker information of the particular location and sends the generated list to the mobile device (205). The list of postulated tasks includes information with respect to the advertised product, information about the song or the name of the artist in the song being played, a special offer for the day at the particular location and so the like. The user selects a task from the list of postulated tasks (206). The client application sends the selected task information to the central server (207). The central server in turn plays the selected task at the terminal of the particular location (208).

Figure 3:
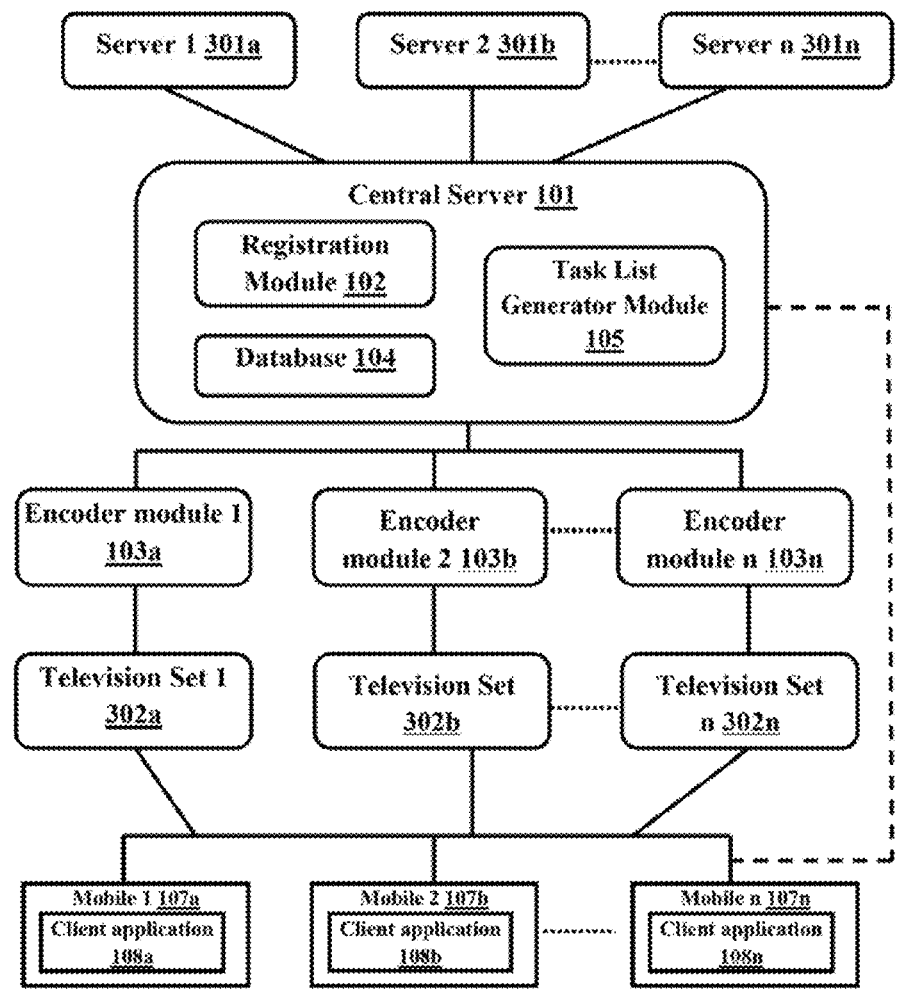
FIG. 3 illustrates a block diagram of a system for encoding a hidden marker in a video file and decoding the hidden marker in a mobile device, according to an exemplary illustration of the present disclosure.

FIG. 3 illustrates a block diagram of a system for encoding a hidden marker in a video file and decoding the hidden marker in a mobile device, according to an exemplary illustration of the present disclosure. With respect to FIG. 3, the database 104 of the central server 101 keeps track of the plurality of servers 301a-302n to fetch the information from the respective servers 302a-302n based on the video content information embedded in the hidden marker. The encoder module 103a-103n is placed in the vicinity of each of the television sets 302a-302n. The video content is sent to the encoder module 103a to 103n from the central server 101. The encoder module 103a-103n embeds/encodes the hidden marker in a multimedia (video file) and sends the video file to the respective television sets 302a-302n. The video file with embedded/encoded hidden marker is played at respective television sets 302a-302n.

The user initializes the client application 108a-108n pre-installed in the mobile device 107a-107n. The client application 108-108n recognizes the hidden marker embedded/encoded in the video file. Further, the client application 108a-108n decodes the recognized hidden marker. The decoded hidden marker's information is sent to the database 104 of the central server 101. The database 104 fetches information from the respective server 301a to 301n based on the video content information embedded in the hidden marker. The collected information is then sent to the task list generator module 105 of the central server 101. The task list generator module 105 generates a list of postulated tasks based on the video content information and sends the list to the mobile device 107a-107n.

The user selects at-least one task from the list of postulated tasks. The selected task is fed back to the database 104 of the central server 101 fetch the related information with respect to the selected task from the respective servers 301a to 301n. The fetched information i.e. a video is played at the television sets 302a-302n respectively.

Figure 4:
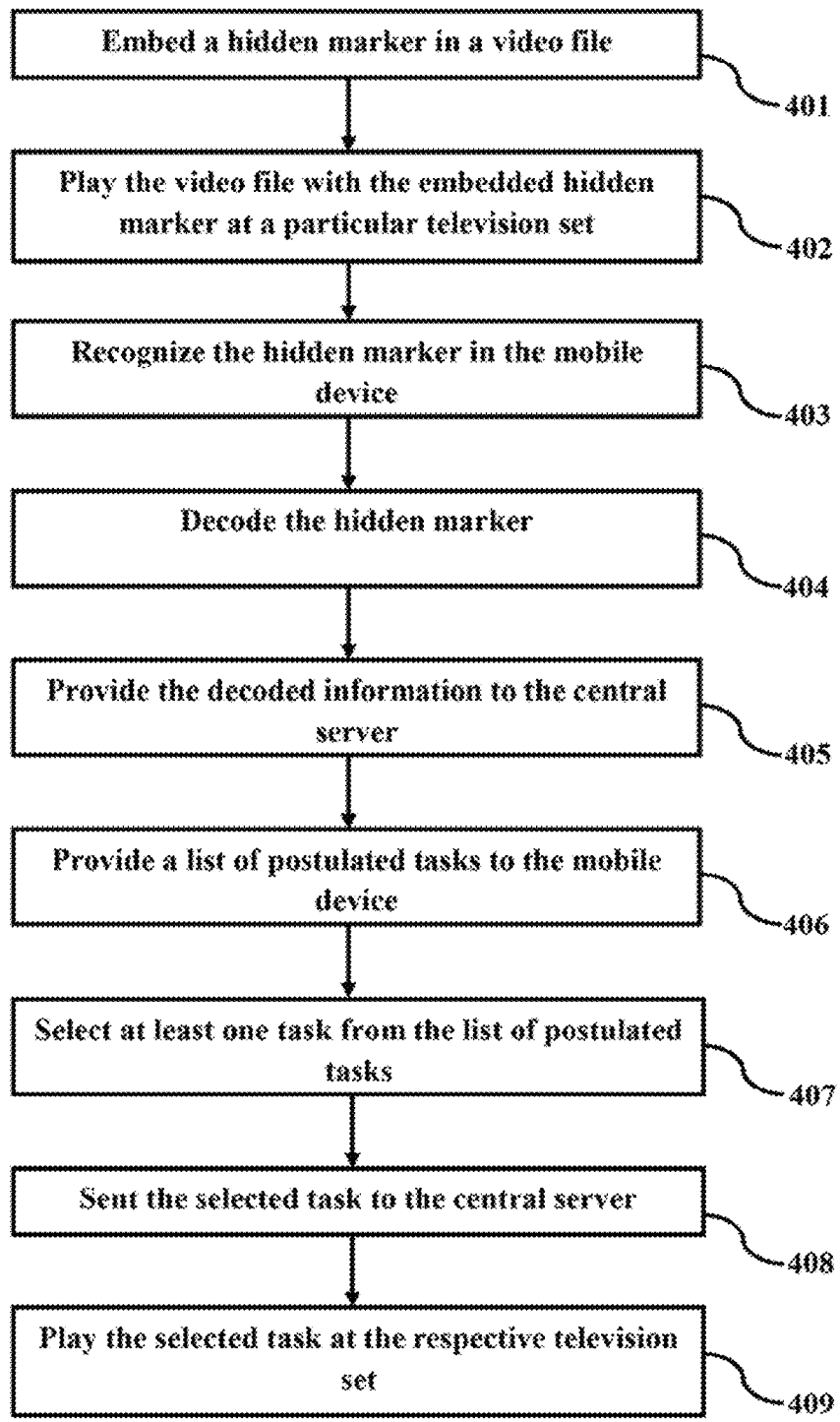
FIG. 4 is a flow chart illustrating a method for encoding a video file in a multimedia file and decoding the embedded video file in a mobile device, according to an exemplary illustration of the present invention.

FIG. 4 is a flow chart illustrating a method for encoding a video file in a multimedia file and decoding the embedded video file in a mobile device, according to an exemplary illustration of the present invention. With respect to FIG. 4, a hidden marker is embedded along with the multimedia content of a video file at the central server (401). The hidden marker comprises the information like unique ID for each television sets, the video content played at respective television sets at that particular time, location and the like. The video file embedded/encoded with the hidden marker is played at the respective television sets (402). The video file is any one of a song, a movie, advertisement related to products, the ongoing offers, a travel and tourism and the like. The client application is pre-installed in the mobile device of the user. The mobile device is any one of a smart, phone, a laptop, a tablet, a personal digital assistant (PDA) etc. The user initializes the client application in the mobile device. The client application recognizes the hidden marker embedded/encoded in the video file (403) and decodes the hidden marker (404). Further, the client application sends the decoded hidden marker information to the central server (405). The central server recognizes the unique ID of the television sets and the video content being played at that particular time from the decoded hidden marker. The central server keeps a track on a plurality of servers and fetches the information relevant to that particular video content from a respective server. For Example: Server 1 fetches information related to weather conditions, Server 2 fetches information related to movies and Server n fetches information related to sports etc. The central server generates a list of postulated tasks based on the information collected from the respective server and sends the generated list to the mobile device (406). The list of postulated tasks includes the information with respect to the video content being played at that particular time. The user selects a task from the list of postulated tasks (407). The client application sends the selected task information to the central server (408). The central server in turn plays the video content of the selected task on the television sets (409).

Figure 5:
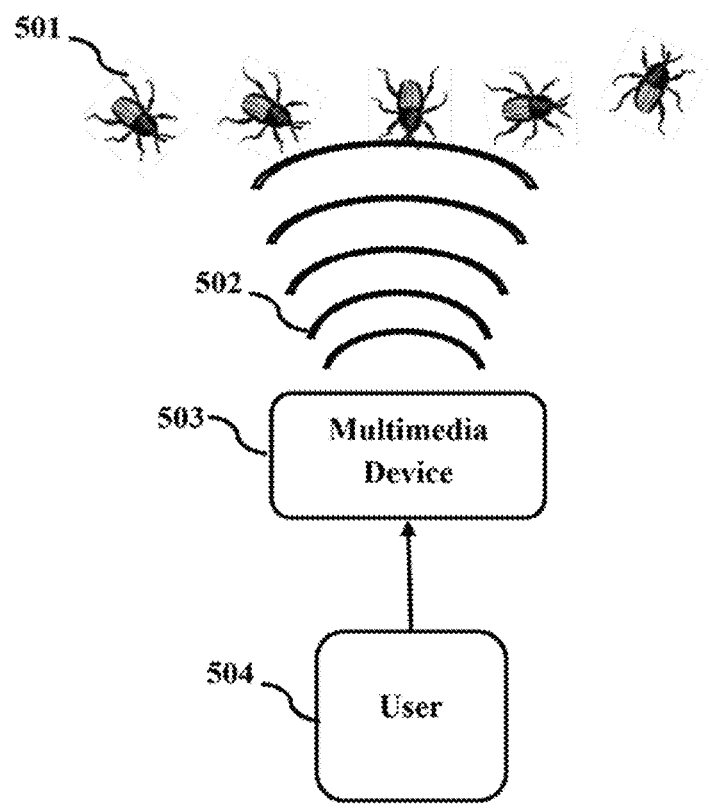
FIG. 5 illustrates a block diagram of a system for eradicating/expelling the pests from an area by playing an ultrasonic frequency signal encoded in a multimedia file, according to an embodiment of the present disclosure.

FIG. 5 is a scenario diagram illustrating a method of expelling pests from an area by playing an ultrasonic frequency signal encoded in a multimedia file, according to an embodiment of the present disclosure. With respect to FIG. 5, a pest 501 is present within a particular area. The area is any one of a closed room or an open area. The user 504 either selects a basic multimedia device 503 or a multimedia player with a pre-installed application or the hardware module capable of playing the encoded multimedia file. The application/hardware module is configured to the processor, speaker and other components of the multimedia device 503 essential in eradicating the pests 501. The other components comprises are but not limited to the oscillator circuits, infrared, emitter, etc.

The user downloads a desired multimedia file encoded with the ultrasonic frequency signal to the multimedia device from a terminal. The terminal is any one of a downloading portal, a broadcasting station, a central server, CDs, or DVD's. The multimedia file comprises any of a song, movie, video, music, etc. which the user plays for pleasure. In addition to the above, the multimedia file also includes a hidden pest deterrent ultrasonic frequency signal. The user plays the encoded multimedia file in the multimedia device. The multimedia device separates the pest deterrent ultrasonic frequency signal from the encoded multimedia file and emits both the contents through the speakers. The emitted ultrasonic frequency signal is an audio wave which propagates through the perceptible medium of the pests. The emitted ultrasonic frequency signal 502 causes a behavioral change or irritation in the pests 501, when the pest 501 comes in the vicinity of the emitted ultrasonic frequency signal 502. Due to which, the pest 501 changes its direction and goes away from the area. If the pest stays very close to the ultrasonic wave for a considerable period of time, the pest is killed or is immobilized.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A method for location based content delivery, the method comprises:
    encoding a hidden marker in a multimedia file;
    playing the multimedia file with the hidden marker at a terminal of a particular location;
    initializing a client application pre-installed in a mobile device;
    recognizing the hidden marker in the multimedia file through the client application;
    decoding the hidden marker in the mobile device;
    sending the decoded hidden marker information to a central server;
    generating a list of postulated tasks based on the hidden marker information of the particular location in the central server;
    sending the list of postulated tasks to the mobile device;
    selecting a task from the list of postulated tasks through the client application;
    sending the selected task information to the central server through the client application;
    playing the selected, task at the terminal of the particular location by the central server;
    performing a plurality of customizable functionalities based on user preferences; and
    embedding an ultrasonic frequency signal in at least one layer of the multimedia file, and wherein the embedded ultrasonic frequency signal is a pest deterrent frequency signal.

2. The method of claim 1, further comprises:
    registering one or more service providers with the central server; and
    fetching a selected task from respective service of the service providers based on the information embedded in the hidden marker.

3. The method of claim 1, wherein the multimedia file is one of a text, a still image, an audio, a video, an animation and interactivity content forms.

4. The method of claim 1, wherein the hidden marker is one of a text, a still image, an audio, a video, an animation and interactivity content forms.

5. The method of claim 1, wherein the hidden marker information for a video comprises at least one of an unique ID of an IP TV, program details, multimedia content, advertisements, promotions and offers.

6. The method of claim 1, wherein the hidden marker information for an audio comprises at least one of ongoing offers, deals, services, new services and new launchers at the particular location.

7. The method of claim 1, wherein the list of postulated tasks includes information with respect to an advertised product information about the song or name of an artist in the song being played, a special offer for a given day at a particular location, information related to weather conditions, information related to movies, and information related to sports.

8. A system for location based content delivery, the system comprising:
    a central server for encoding a hidden marker in a multimedia file;
    a terminal for playing the multimedia file;
    a mobile device for capturing the multimedia file; and
    a client application pre-installed in the mobile device for capturing and decoding the hidden marker;
    wherein the multimedia file is further embedded with an ultrasonic frequency signal, and wherein the ultrasonic frequency signal is embedded in at least one layer of the multimedia file, and wherein the embedded ultrasonic frequency signal is a pest deterrent frequency signal.

9. The system of claim 8, wherein the central server further comprising:
    a registration module for registering the mobile device associated with one or more users and one or more service providers;
    an encoder module for encoding the hidden marker in the multimedia, file;
    a database for storing information received from the one or more service providers; and
    a task list generator module for generating one or more tasks.

10. The system of claim 9, wherein the task list generator module is adapted to generate a list of postulated tasks and transmit the generated list of postulated tasks to the mobile device.

11. The system of claim 9, wherein the database fetches the information related to a selected task from at least one server of a service provider and plays the selected task at a terminal of a particular location.

12. The system of claim 9, wherein the database keeps track of one or more service providers for fetching information from respective servers based on the hidden marker information embedded in the multimedia file.

13. The system of claim 9, wherein the encoder module extracts at least one of service provider details, services offered and location details from a database, where the extracted information is encoded as the hidden marker in the multimedia tile.

14. The system of claim 8, wherein the client application pre-installed in the mobile device is adapted to decode the hidden marker in the multimedia file and send the decoded information to a task list generator module of the central server.

15. The system of claim 8, wherein a user selects at-least one task from a list of postulated tasks and feeds back to a database of the central server through the client application pre-installed in the mobile device.

16. The system of claim 8, wherein the mobile device is one of a mobile phone, a smart phone, a tablet, a laptop, a personal digital assistance (PDA), an audio player or a stereo system.

17. The system of claim 8, wherein a list of postulated tasks includes information with respect to an advertised product, information about the song, or name of an artist in the song being played, a special offer for a given day at a particular location, information related to weather conditions, information related to movies, and information related to sports.

18. The system of claim 8, wherein a plurality of customizable functionalities is performed based on user preferences.

* * * * *